March 8, 1966     N. J. MENOLASINO ETAL     3,239,429
APPARATUS FOR TESTING THE EFFECTIVENESS OF STERILIZATION BY HEAT
Filed Feb. 25, 1963
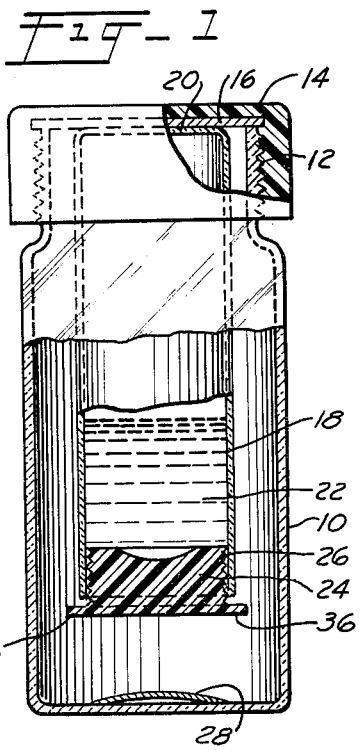
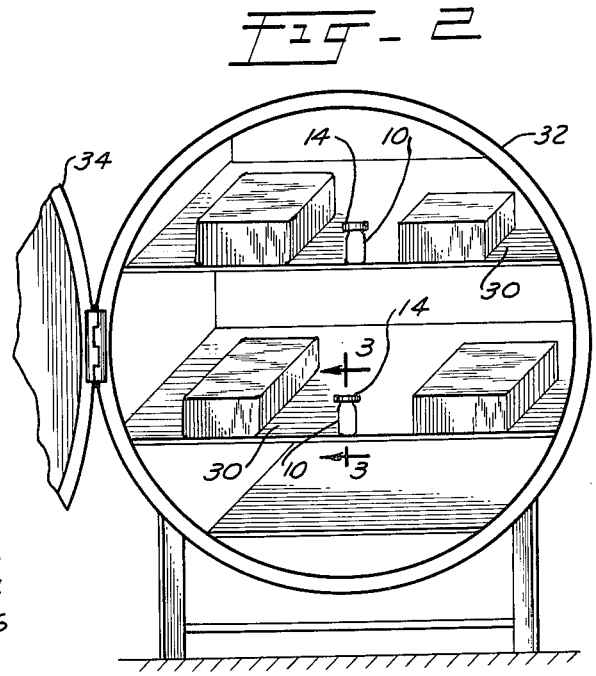
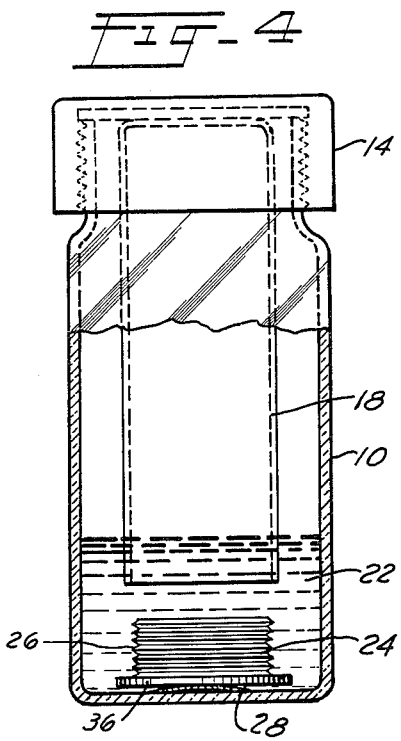
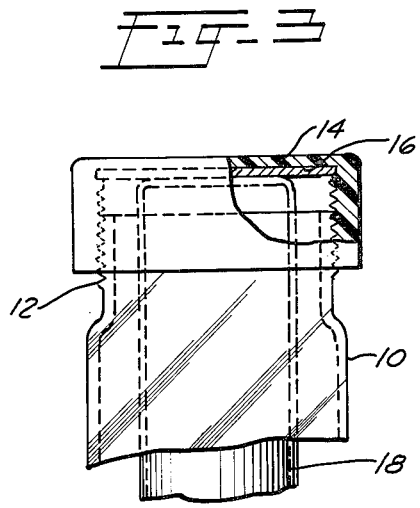
INVENTORS
NICHOLAS J. MENOLASINO,
ALLAN S. BELCOVE,
AND SEYMOUR SANTOW
BY *Bair, Freeman & Molinare*
ATTORNEYS

# United States Patent Office 3,239,429
Patented Mar. 8, 1966

3,239,429
APPARATUS FOR TESTING THE EFFECTIVENESS
OF STERILIZATION BY HEAT
Nicholas J. Menolasino, 1313 N. 14th Ave., Melrose Park, Ill., and Allan S. Belcove, 4940 Coyle Ave., and Seymour Santow, 8444 Kedvale, both of Skokie, Ill.
Filed Feb. 25, 1963, Ser. No. 260,774
3 Claims. (Cl. 195—54)

This invention relates generally to sterilization testing and more particularly to an improved method and apparatus for checking the presence or absence of live micro-organisms following sterilization in sterilizing apparatus.

A number of practices have been developed in the prior art for testing the effectiveness of a sterilization procedure. One typical and widely used practice involves the placement of absorbent strips containing live spores in the sterilization apparatus together with the objects to be sterilized. After sterilization, the absorbent strips are openly transferred to a culture media for placement within an incubator to cause the growth of any micro-organisms which may have survived the sterilization. This prior art technique is limited by the required handling of the absorbent strips and the container holding the culture media since contamination thereof may result.

Accordingly, it is a general object of this invention to provide a new method and apparatus for testing the effectiveness of sterilization which overcomes the limitations of the prior art practices.

More specifically, it is an object of this invention to provide a sterilization testing method and apparatus which utilizes a spore impregnated media, such as absorbent discs, in a completely self-contained assembly to eliminate any open transfer of the discs from one container to another.

It is another object of this invention to provide a unique sterilization testing method and apparatus which comprises a self-contained assembly of a first container having a nutrient culture media, a second container having a spore impregnated media, and releasable sealing means on one of said containers for preventing contact between the culture media and the spore impregnated media, until the end of the sterilization cycle even though the container having the releasable sealing means is positioned within the other container during the entire testing procedure.

It is still another object of this invention to provide a novel sterilization testing method and apparatus which utilizes the self-contained combination of an inner container positioned within an outer container, a spore impregnated carrier in one container, a nutrient culture media within the other container, and a releasable stopper on the inner container for keeping the carrier and nutrient out of contact with each other both before and during the sterilization cycle, wherein the pressure reduction within the outer container due to the temperature drop at the end of sterilization cycle causes the stopper to be ejected from the inner container to permit the nutrient to mix with the spore impregnated carrier.

It is a further object of this invention to provide a novel sterilization testing method and apparatus comprising a self-contained assembly, as above, wherein the outer container enclosing the mixture of nutrient and spore impregnated carrier may be placed within an incubator or any other suitable temperature environment to cause the growth of any micro-organisms which may have survived the sterilization for indicating the effectiveness of the sterilization procedure, all without any transfer or handling of the type which might lead to the contamination of the disc.

It is a still further feature of this invention to provide a new and improved sterilization testing method and apparatus which is characterized by its completely self-contained nature which eliminates the possibility of contamination by handling or transfer, by its control over the number of micro-organism spores required for proper testing procedures, and by its ability to be used under either aerobic or anaerobic conditions.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

FIGURE 1 is an elevational view, partly broken away and partly in cross-section, of one illustrative embodiment of a self-contained sterilization testing apparatus embodying the invention;

FIGURE 2 is a pictorial view of the sterilization apparatus of the present invention in operative position within an autoclave prior to the sterilization cycle;

FIGURE 3 is an elevational view, partly broken away and partly in cross-section, of the illustrative sterilization apparatus taken substantially as shown along line 3—3 of FIGURE 2; and FIGURE 4 is an elevational view, partly broken away and partly in cross-section, of the sterilization apparatus embodying the invention at the end of the sterilization cycle and in condition for the incubating-indicating function.

Referring now to the drawing, and more particularly to FIGURE 1 thereof, there is illustrated one preferred embodiment of sterilization apparatus constructed in accordance with the invention. While the sterilization apparatus of the invention has been disclosed in this preferred form, it will be appreciated by those skilled in the art, that the principles of the invention may be embodied in other forms and that the invention is not to be construed in any way as limited to the preferred form shown in FIGURE 1.

As disclosed in FIGURE 1, the invention comprises an outer vial or container 10 which advantageously may be constructed of any suitable material, such as glass, plastic, or the like. Preferably, the vial material is transparent so that the effectiveness of the sterilization cycle can be visually observed in the manner described in greater detail hereinbelow. In one advantageous embodiment, the neck of the vial or container 10 is provided with suitable external threads 12 adapted to receive an internally threaded cap member 14 which may be screwed onto the container 10 for sealing and closing the open neck of the container. Advantageously, the cap 14 may be formed of plastic, metal, or of any other material suitable to close and seal the container 10. Alternatively, the outer vial 10 may take the form of a one-piece ampule or cylinder comprising a top adapted to be bonded in place after an inner vial or container is positioned within the outer vial.

In accordance with well-known practices, the inner flat surface of the cap 14 may be provided with a resilient sealing disc 16 of the type normally used to effect a fluid tight seal between the cap and the container. However, if desired, the resilient disc 16 may be eliminated without affecting the principles or operation of the present invention.

In accordance with a salient feature of the present invention, a second vial or container 18 of smaller dimension than the outer vial or container 10 is positioned within the outer container. The inner container 18 also may be formed of glass or plastic, if desired, but it is not necessary that the inner container 18 be made of transparent material if this is not desired.

While in accordance with the principles of the invention, the inner container 18 may be loosely positioned within the outer container 10, it is desirable in accordance with one aspect of this invention, to mount the inner container 18 to the inner surface of the cap 14. This may readily be effected by attaching the bottom wall 20 of the inner container 18 to the resilient sealing disc 16 by any suitable adhesive so that the inner container 18 is rigidly supported by the cap 14 in an inverse position with the open end of the inner container 18 facing downwardly within the outer container 10. Those skilled in the art will readily appreciate that the advantages of mounting the inner container 18 in an inverse position to the cap 14, as shown in FIGURE 1, include the prevention of any rattling or possible breakage of the inner container 18 within the outer container 10 during shipping and handling of the inventive apparatus. This construction also facilitates the release of the stopper from the inner container 18 during the use of the sterilization apparatus, as described in greater detail hereinbelow.

In accordance with the further feature of this invention, the inner container 18 is filled with a nutrient culture medium, as for example, a nutrient broth of any suitable type known in the art for supporting the growth of micro-organism spores under incubation conditions. One type of broth suitable for this purpose is a fluid thioglycollate medium of the type which has been standardized to a pH of 7.4. Advantageously, a color indicator, such as phenol red, may be added to the nutrient broth so that the incubation of the micro-organism spores following the sterilization cycle will result, by means well understood in the art, in a color change to indicate the presence of any spores which have survived sterilization. Obviously, those skilled in the art will appreciate that other color indicators, such as bromcresol purple, may be used with the nutrient broth to provide this function.

In the assembly of the self-contained sterilization apparatus of the present invention, the nutrient broth 22 is poured into the inner container 18 when the latter is in an upright position. After a proper amount of nutrient broth 22 is placed into the inner container 18, the inner container is sealed with a releasable stopper, such as the rubber stopper 24 which is pressed into the open end of the inner container 18. Advantageously, the releasable stopper 24 may be formed of other fluid impervious materials, such as plastic or the like, and if desired, may be provided with suitable serrations 26 around its outer periphery to insure a fluid tight seal between the stopper 24 and the inner vial 18.

Before the cap 14 and the inner vial 18 are positioned with respect to the outer container 10, the outer container 10 is provided with the proper number of micro-organism spores. In one aspect of this invention, these micro-organism spores may be carried in a suitable liquid or solid medium, or if desired, the spores may be dried on the inside surface of the outer container 10. In the particular illustrative embodiment of the invention shown in FIGURE 1, the micro-organism spores advantageously are contained in a disc 28 made of absorbent paper such as filter or blotter paper so that the micro-organism spores will stay within the fibers of the paper after the paper has been impregnated and dried. Those skilled in the art will appreciate that the spore population within the outer vial 10 should be standardized so as to meet public health standards relating to sterilization testing and control. For example, the spores preferably should be of the aerobic and anaerobic type, and should be of such a number that all of the spores will be killed during a proper sterilization cycle comprised of exposing the spores to a predetermined temperature for a predetermined time period within the autoclave.

Referring again to FIGURE 1, it can be seen that after the spore disc 28 is inserted within the outer container 10, the cap 14 is positioned on the neck of the outer container so as to place the inner container 18 in upside down position within the outer container directly above the spore disc 28. The sterilization apparatus of the invention now is completely assembled and is completely self-contained, ready for shipment, storage, and use at a later date. As stated hereinabove, the secure mounting of the inner vial 18 to the inner flat surface of the cap 14 prevents the inner vial 18 from being loose within the outer container during shipping and handling so as to prevent rattling and possible breakage thereof.

The use of the inventive sterilization apparatus now will be described. The outer vial or container 10, with the inner container 18 positioned therein by the cap 14, is placed in an autoclave 32 prior to the sterilization cycle, as shown in FIGURE 2. Advantageously, several sterilization testing vials 10 may be positioned on different shelves 30 throughout the autoclave 32 and, in particular, it is desirable to position these vials 10 in the autoclave load in the places most difficult to sterilize. Thus, the vials 10 can be placed within the package of bandages, linens, instruments, and the like, and sealed right up with the package to enable the operator to accurately determine if the center of the package is properly sterilized. The autoclave door 34 is closed and the autoclave sterilization cycle is initiated. The time and temperature for the sterilization cycle will, of course, be related to the specific type of micro-organism spores which are used in the invention testing apparatus. Thus, if the micro-organism spores which impregnate the absorbent disc 28 are of the *Bacillus stearothermophilus* type, then the spore population should be standardized so that sterilization may be completed after the sterilization cycle at 121 degrees centigrade for fifteen minutes. Similarly, for example, if the micro-organism spore is of the type known as *Bacillus subtilis*, then the spore population should be in the range of 100,000 to 1,000,000 viable spores per disc, and the sterilization cycle should be standardized so that the spores will be maintained at a temperature of 104 degrees centigrade for a period of fifteen minutes. Thus, it will be appreciated that if the micro-organism spores are exposed in the autoclave to a lower temperature or for a shorter time period, growth will occur from the surviving spores to indicate unsatisfactory sterilization.

After the autoclave door 34 is closed and the sterilization cycle is initiated, the autoclave temperature and pressure rise in accordance with well-known principles. As such, there will be a temperature and pressure build-up inside of the outer container 10, and after a time lag, there will be a similar temperature and pressure build-up inside of the inner container 18, said temperature and pressure build-up in the inner container being due to the water present in the nutrient broth 22. If desired, the cap 14 may be cracked, i.e., opened by slight rotation, before the vial is placed in the autoclave to insure that steam actually contacts the spores on the absorbent disc 28. This is illustrated in FIGURE 3 of the drawing which shows the cap 14 of the outer container 10 loosened and slightly raised with respect to its fully tightened position on the neck of the outer container 10. However, if desired, the outer vial 10 may be placed in the autoclave with the cap 14 tightened thereon.

During the temperature and pressure build-up within the autoclave 32, it will be noted that the temperature and pressure within the outer container 10 builds up more quickly than the pressure and temperature within the inner container 18. Due to this differential in pressure on the opposite sides of the resilient stopper 24 in the opening of inner container 18, there will be a tendency for the releasable stopper to be drawn inwardly. This tendency is completely overcome by the provision of the outwardly extending flange 36 which is provided on the outer surface of the releasable stopper 24. Manifestly, as will be appreciated by those skilled in the art, the outwardly extending flange 36 may be separately formed and connected to the releasable stopper 24, or if desired, it may be formed integrally therewith. Thus, the outwardly extending flange 36 of greater diameter than the opening in the inner container 18 prevents the releasable stopper 24 from being drawn within the inner container during the temperature and pressure rise portion of the sterilization cycle.

After the sterilization cycle in the autoclave 32 is completed, it will be appreciated that the autoclave temperature and pressure will have been reduced from its maximum values to much lower values. Upon cooling of the autoclave, the temperature and pressure outside of the inner vial 18, and within the outer container 10, drop at a faster rate than the reduction in temperature and pressure within the inner container 18. This is due to the fact that the temperature and pressure within the outer container 10 will follow the autoclave temperature and pressure, while the temperature and pressure within the inner container 18 will lag in its cooling rate due to the presence of the nutrient broth therewithin. Again, a differential pressure exists on opposite sides of the releasable stopper 24, with the greater pressure being within the inner container 18 and with the lesser pressure being on the outside of the inner container 18. This pressure differential causes the releasable stopper 24 to pop out or to be ejected from the opening of the inner container 18 to thereby permit the nutrient broth 22 within the inner container 18 to flow outwardly to the bottom of the outer container 10. The nutrient broth 22 thus mixes with the spore impregnated disc 28 to cause the growth of any micro-organism spores which may have survived sterilization when the spores are incubated as described hereinbelow.

Advantageously, the cap 14 is tightened upon the outer container 10 and the entire, self-contained, sterilization testing assembly is removed from the autoclave 32 and placed in an incubator to faciltate the growth of any spores which have not been killed during sterilization.

Those skilled in the art will appreciate that the incubator may take any suitable from such as a water bath, an incubating apparatus, or the like, such that the sterilization testing apparatus of the invention may be maintained at a standard temperature required for the optimum growth of the micro-organism spores. It has been found that a standard temperature of 37 degrees centigrade is an optimum growth temperature for one type of spore, while other temperatures ranging from 25 degrees centigrade to 40 degrees centigrade may be used dependent upon the micro-organism spores with which the absorbent disc 28 is impregnated.

As known to those skilled in the art, the presence of any surviving micro-organsim spores after incubation may be indicated by a color change in the nutrient broth. For example, if the nutrient broth comprises thioglycollate fluid sterilized to a pH of 7.4 and having a color indicator such as phenol red added thereto, the growth of any surviving micro-organism spores ferments dextrose and also produces an acid. When the pH drops below 6.8, the phenol red color of the indicator changes to yellow to show that a sterilization failure has taken place. If the nutrient broth retains its red color and there is no color change, the achievement of a sterilization success is indicated. Manifestly, other pH indicators can be used, such as bromcresol purple, and it also will be appreciated by those skilled in the art, that the success or sterilization may be indicated by the turbidity of the nutrient broth.

In the successful use of sterilization test apparatus embodying the invention, it was found that the resilient stopper 24 was popped out or ejected from the inner container 18 upon drop-off of the autoclave pressure from its operating pressure of 15 pounds per square inch gauge pressure (29.7 p.s.i. absolute) to zero pounds per square inch gauge pressure (14.7 p.s.i. absolute). It was contemplated that a proper control can be provided by mixing the nutrient broth with the micro-organism spores aseptically, closing the outer container cap 14 and then incubating the apparatus without autoclaving.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of apparatus for testing the effectiveness of sterilization by heat comprising a self-contained assembly formed of an outer container, an inner container of smaller dimensions than said outer container and positioned within the latter, said inner container having an opening formed therein, a nutrient culture medium in one of said containers, a plurality of micro-organism spores disposed in the other container, pressure releasable sealing means normally closing the opening in said inner container to maintain the nutrient culture medium and said micro-organism spores out of contact with each other before and during the sterilization cycle, flange means on said pressure releasable sealing means to prevent the latter from being drawn into said inner container due to pressure differentials between said inner and outer container during the heating period at the beginning of the sterilization cycle, said pressure releasable sealing means being frictionally held within the opening in said inner container until the dropping of pressure within said outer container during the cooling period at the end of the sterilization cycle causes said pressure releasable sealing means to be ejected from the inner container opening, said inner container being positioned within said outer container so as to permit said nutrient culture medium and said micro-organism spores to mix with each other after said pressure releasable sealing means is ejected from the inner container opening, and means for sealing the outer container to enable the self-contained assembly to be incubated after sterilization to cause the growth of any micro-organism spores which may have survived sterilization and thereby indicate the effectiveness of the sterilization cycle.

2. The improvement of apparatus for testing the effectiveness of sterilization by heat comprising a self-contained assembly formed of an outer container, an inner container of smaller dimensions than said outer container and positioned with the latter, said inner container having an opening formed therein, a nutrient culture medium in one of said containers, a plurality of micro-organism spores disposed within the other container, pressure releasable sealing means normally closing the opening in said inner container to maintain the nutrient culture medium and said micro-organism spores out of contact with each other before and during the sterilization cycle, said pressure releasable sealing means being frictionally held within said inner container opening such that the dropping of pressure within said outer container during the cooling period at the end of the sterilization cycle causes said pressure releasable sealing means to be ejected from the inner container opening to permit said nutrient culture medium and said micro-organism spores to mix with each other, cap means for sealing the outer container to enable the self-contained assembly to be incubated after sterilization to cause the growth of any micro-organism spores which may have survived sterilization and thereby indicate the effectiveness of the sterilization cycle, and means for mounting a closed end of the inner container upon said cap means in inverse position such that said cap means supports said inner container with its opening facing away from said cap means within said outer container, so as to enable the nutrient culture medium and the micro-organism spores to mix with each other after said pressure releasable sealing means is ejected from said inner container opening.

3. The improvement of apparatus for testing the effectiveness of sterilization by heat comprising a self-contained assembly formed of an outer container, an inner container of smaller dimensions than said outer container and positioned within the latter, said inner container having an opening formed therein, a nutrient culture medium in said inner container, an absorbent member impregnated with a plurality of micro-organism spores in the outer container, pressure releasable stopper means normally closing the opening in said inner container to maintain the nutrient culture medium and said micro-organism spores out of contact with each other before and during the sterilization cycle, said pressure releasable stopper means being frictionally held within said inner container opening such that the dropping of pressure within said outer container during the cooling period at the end of the sterilization cycle causes said pressure releasable stopper means to be ejected from the inner container opening to permit said nutrient culture medium and said micro-organism spores to mix with each other, cap means for sealing the outer container to enable the self-contained assembly to be incubated after sterilization to cause the growth of any micro-organism spores which may have survived sterilization and thereby indicate the effectiveness of the sterilization cycle, means for mounting a closed end of said inner container to said cap means whereby said cap means supports said inner container with its opening extending toward said absorbent member, and flange means on said stopper of greater diameter than said inner container to prevent the stopper from being drawn into said inner container when the pressure within the outer container exceeds the pressure within the inner container during the sterilization cycle.

References Cited by the Examiner

UNITED STATES PATENTS

| | | | |
|---|---|---|---|
| 2,660,171 | 11/1953 | Dickinson | 206—47 |
| 2,753,990 | 7/1956 | Chalfin et al. | 206—47 |
| 2,854,384 | 9/1958 | Beakley et al. | 195—54 |
| 2,950,202 | 8/1960 | Brockmann | 195—54 |
| 2,981,435 | 4/1961 | McCarthy | 206—47 |

FOREIGN PATENTS 509,680 8/1953 Belgium.

A. LOUIS MONACELL, *Primary Examiner.*